(12) United States Patent
Masuzawa

(10) Patent No.: US 10,445,028 B2
(45) Date of Patent: Oct. 15, 2019

(54) DISPLAY DEVICE AND CONTROL METHOD

(71) Applicant: SEIKO EPSON CORPORATION, Tokyo (JP)

(72) Inventor: Kenta Masuzawa, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/816,871

(22) Filed: Nov. 17, 2017

(65) Prior Publication Data

US 2018/0143795 A1 May 24, 2018

(30) Foreign Application Priority Data

Nov. 21, 2016 (JP) .................................. 2016-225824

(51) Int. Cl.
*G06F 3/12* (2006.01)
*G06K 15/02* (2006.01)
*G06F 3/14* (2006.01)

(52) U.S. Cl.
CPC .......... *G06F 3/1207* (2013.01); *G06F 3/1204* (2013.01); *G06F 3/1229* (2013.01); *G06F 3/1253* (2013.01); *G06F 3/1259* (2013.01); *G06F 3/1285* (2013.01); *G06F 3/1292* (2013.01)

(58) Field of Classification Search
None
See application file for complete search history.

(56) References Cited

U.S. PATENT DOCUMENTS

| | | | | |
|---|---|---|---|---|
| 6,856,413 B1* | 2/2005 | Roosen | ................ | G06F 3/1207 358/1.13 |
| 2002/0015180 A1* | 2/2002 | Tominaga | ............... | G06F 3/121 358/1.15 |
| 2002/0095352 A1* | 7/2002 | Hitaka | ................... | G06Q 10/06 705/26.1 |
| 2006/0039707 A1* | 2/2006 | Mima | ................... | B41J 2/17546 399/23 |
| 2006/0200571 A1* | 9/2006 | Backman | ............ | H04L 41/0803 709/230 |
| 2007/0198102 A1* | 8/2007 | Umehara | .............. | G06F 3/1204 700/32 |
| 2008/0052384 A1* | 2/2008 | Marl | .................... | H04L 12/2807 709/223 |
| 2011/0069341 A1* | 3/2011 | Kim | ...................... | G06F 3/1204 358/1.15 |
| 2012/0053868 A1* | 3/2012 | Matsumoto | ............... | G06F 1/28 702/61 |
| 2013/0114100 A1* | 5/2013 | Torii | ................... | G06F 11/0733 358/1.14 |

(Continued)

FOREIGN PATENT DOCUMENTS

JP 2003-280853 10/2003

*Primary Examiner* — Beniyam Menberu
(74) *Attorney, Agent, or Firm* — Workman Nydegger

(57) ABSTRACT

Technology enabling knowing the status of, and managing, multiple printers is provided. A display device includes: a display; a first display means configured to present multiple images corresponding to multiple different printers on the display in a two-dimensional arrangement; and a second display means configured to present on the display printer information relating to a status of the printer corresponding to each image.

15 Claims, 7 Drawing Sheets

(56) References Cited

U.S. PATENT DOCUMENTS

2014/0026092 A1\* 1/2014 Oguma ................ G06F 3/0481
715/777
2015/0062629 A1\* 3/2015 Tamura .............. H04N 1/00307
358/1.15

\* cited by examiner

DISPLAY DEVICE AND CONTROL METHOD

BACKGROUND

1. Technical Field

The present invention relates to technology for managing multiple printers.

2. Related Art

JP-A-2003-280853 describes technology enabling displaying an icon corresponding to each of multiple printers on a display, thereby enabling managing multiple printers shared by multiple users. Such a display is convenient because the user can easily visually grasp the multiple printers that are managed.

However, the technology described in JP-A-2003-280853 does nothing more than display an icon representing each printer. As a result, the technology in JP-A-2003-280853 is deficient in terms of managing multiple printers based on knowing the current status of each printer.

SUMMARY

An objective of the present invention is to provide technology enabling managing multiple printers based on the current status of each printer.

A display device according to an aspect of the invention includes: a display; a first display means configured to present multiple images corresponding to multiple different printers on the display in a two-dimensional arrangement; and a second display means configured to present on the display printer information relating to a status of the printer corresponding to each image.

Another aspect of the invention is a display method including: displaying multiple images corresponding to multiple different printers in a display in a two-dimensional arrangement; and displaying in the display printer information relating to a status of the printer corresponding to each image.

The invention (display device, display method) thus comprised can display multiple images corresponding to multiple different printers in a display in a two-dimensional arrangement. As a result, multiple managed printers can be easily differentiated visually. In addition, printer information related to the status of the printer corresponding to a particular image can be presented in the display. Therefore, the status of multiple printers can be known, and the printers can be managed.

In a display device according to another aspect of the invention, the display can change between and display any one of multiple windows; the multiple windows include an image window for displaying images, and an information window for displaying printer information; an information window is provided for each printer; the first display means presents multiple images in the image window; and the second display means presents printer information for a specific printer in a window corresponding to the specific printer.

This configuration enables acquiring printer information indicating the status of a desired printer by changing the content of the window presented on the display.

In a display device according to another aspect of the invention, the second display means displays the printer information as an animation of an operation required for the printer corresponding to the image.

This configuration enables the user to reliably execute the required operation by following the animated instructions.

In a display device according to another aspect of the invention, the animation the second display means displays is the procedure required to resolve an error that occurred in the printer.

This configuration enables the user to resolve a printer error by following the animated instructions.

In a display device according to another aspect of the invention, the second display means displays the content of an error that occurred on the printer and a button for playing the animation, and when the button is operated, displays the procedure required to resolve the error that occurred in the printer.

This configuration enables the user, by reading the content of the error and operating the button, to know the content of the error and execute the operation required to resolve the error by following the animated instructions.

In a display device according to another aspect of the invention, the second display means displays printer information for a printer with a higher frequency of use larger than for a printer with a lower frequency of use.

This configuration enables the user to easily acquire printer information about a frequently used printer.

In a display device according to another aspect of the invention, the second display means displays as the printer information the name of a print job of the printer or the progress of the print job.

This configuration enables the user to easily check the name or current status (progress) of a print job.

In a display device according to another aspect of the invention, the second display means displays, as the printer information, a required action corresponding to the status of the printer.

This configuration enables the user to appropriately take a required action.

In a display device according to another aspect of the invention, the display changes the display format between an image indicating the printer information of the corresponding printer meets a specific condition, and an image indicating the printer information of the corresponding printer does not meet the specific condition.

This configuration enables easily known which printers for which the printer information meets specific conditions.

A display device according to another aspect of the invention, preferably also has an input device enabling inputting the specific condition.

This configuration enables easily known which printers for which the printer information meets specific conditions by the user inputting conditions through the input device.

In a display device according to another aspect of the invention, the printer information includes multiple types of information about the corresponding printer; and the second display means displays information selected from the multiple types of information for the printer on the display.

This configuration enables acquiring selected information about multiple printers in a single batch.

In a display device according to another aspect of the invention, the display is disposed to a management device configured to manage the printers.

In this configuration, the user of the management device can easily acquire the status of multiple printers and manage the printers appropriately.

In a display device according to another aspect of the invention, the display changes the display format between images corresponding to the printers the management device manages, and images corresponding to the printers the management device does not manage.

This configuration enables easily determining which printers a specific management device manages.

In a display device according to another aspect of the invention, the display is disposed to a mobile terminal.

In this configuration, the user of the mobile terminal can easily acquire the status of multiple printers and manage the printers appropriately.

Other objects and attainments together with a fuller understanding of the invention will become apparent and appreciated by referring to the following description and claims taken in conjunction with the accompanying drawings.

DESCRIPTION OF EMBODIMENTS

Figure 1:
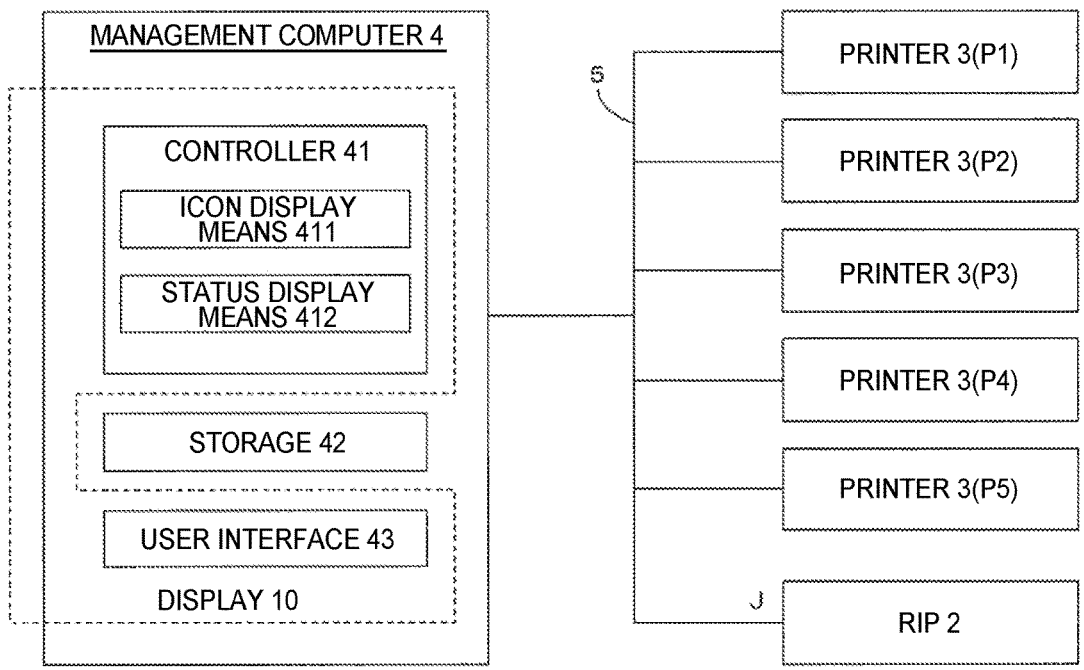
FIG. 1 is a block diagram of an example of a printing system.

FIG. 1 is a block diagram of an example of a printing system.

This printing system 1 includes a RIP (raster image processor) 2 and multiple (five in this example) printers 3, and executes a printing process causing the RIP 2 to generate print jobs J, and a printer 3 to print the images expressed by the print job J. Reference numerals P1 to P5 are used herein to differentiate the five printers 3.

The printing system 1 further includes a management computer 4 that controls the RIP 2 and printers 3, and a network 5 (such as a local area network) connecting the management computer 4, RIP 2, and printers 3.

The management computer 4 includes a controller 41 embodied by a CPU (central processing unit) and RAM (random access memory); storage 42 such as a hard disk drive; and a user interface (user interface) 43.

The RIP 2 creates a print job J, and executes a color management process using an ICC profile appropriate to the print job J. The RIP 2 also rasterizes the print job J after the color management process. The rasterized print job J (raster data) is then sent from the RIP 2 to the printer 3. The printer 3 then executes the received print job J, and prints images expressed by the print job J on a print medium.

Figure 2:
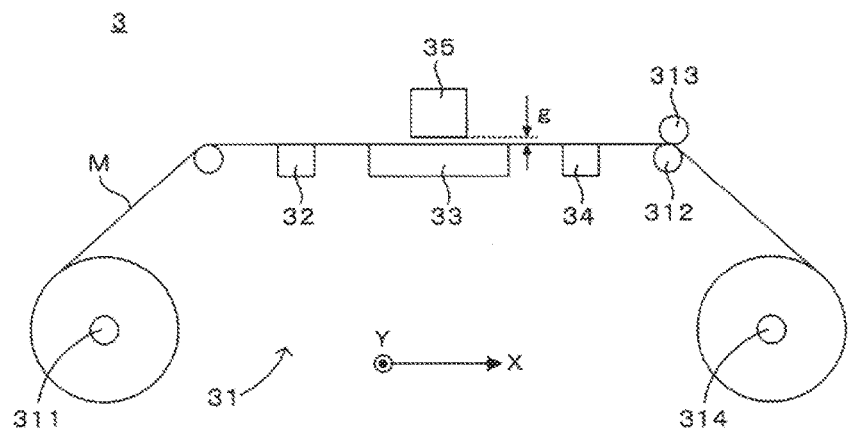
FIG. 2 schematically illustrates the functional configuration of a printer.

FIG. 2 schematically shows an example of the configuration of the printing mechanism of the printer 3. The printer 3 has a roll-to-roll conveyance mechanism 31 that conveys the print medium M in the conveyance direction X. This conveyance mechanism 31 includes sequentially in the conveyance direction X of the print medium M: a delivery roller 311, a pair of rollers 312, 313, and a take-up roller 314. The delivery roller 311 delivers the print medium M in the conveyance direction X from a paper roll. The pair of rollers 312, 313 hold the print medium M delivered by the delivery roller 311. One roller 313 is urged against the other roller 312 to apply a constant load to the print medium M, and the roller 312 conveys the print medium M in the conveyance direction X while applying constant tension to the print medium M by applying specific torque to the print medium M. The take-up roller 314 then rewinds the print medium M conveyed from the pair of rollers 312, 313.

Between the delivery roller 311 and roller 312, the printer 3 has, sequentially in the conveyance direction X, a preheater 32, platen heater 33, and after heater 34, and heats the print medium M touching the tops of the heaters. The printer 3 also has a printhead 35 opposite the platen heater 33 with a specific platen gap g therebetween. The printhead 35 ejects ink using an inkjet printing method to the print medium M supported on the platen heater 33.

By the conveyance mechanism 31 intermittently conveying the print medium M in the conveyance direction X, the printer 3 advances an unprinted portion of the print medium M to the platen heater 33. The printhead 35 then executes a main scanning operation ejecting ink while moving in the scanning direction Y crosswise to the conveyance direction X. The number of passes the printhead 35 makes in the scanning direction Y can be desirably adjusted, and images are formed on the print medium M paused at the platen heater 33 by the printhead 35 executing the main scanning operation the specified number of sets. Furthermore, the drying time by the platen heater 33 of the ink that landed on the print medium M in the previous main scan is controlled by adjusting the interval between the multiple main scans.

Referring again to FIG. 1, the RIP 2 and printer 3 in the printing system 1 are controlled by the management computer 4. More specifically, the management computer 4 controls the operation of the RIP 2 and printer 3 appropriately to the type of the print medium M. More specifically, the ICC profile that should be used in the color management process executed by the RIP 2 differs according to the type of print medium M. The management computer 4 therefore sets the ICC profile in the RIP 2 appropriately to the type of print medium M set to be used in the printing process, and the RIP 2 then applies the color management process to the print job J using the specified ICC profile. Note that communication between the RIP 2 and management computer 4 is handled through an API (Application Programming Interface).

Parameters that define the media type of the print medium M include the physical configuration, such as the length of the print medium M, the width of the print medium M, the thickness of the print medium M, the grammage of the print medium M, the material of the print medium M (such as paper, film, and laminates thereof), the absorptivity of the print medium M, the color of the print medium M, and whether or not there is adhesive on the print medium M. In other words, if one or more aspects of the physical configuration of the print medium M is different, the media type may be treated as different.

When printing by the printer 3, one or more machine parameters may change according to the type of print medium M. The machine parameters may include, for example, the tension on the print medium M, the load of the roller 313, the specific platen gap g, the number of passes in the main scanning direction, the interval between main scans, the interval between passes, the temperature of the preheater 32, the temperature of the platen heater 33, and the temperature of the after heater 34. The management computer 4 therefore sets the machine parameters in the printer 3 according to the type of print medium M scheduled to be used in the printing process, and the printer 3 executes a print job J based on the machine parameters that were set.

Each printer 3 stores a table storing, for each of multiple media types, the machine parameters appropriate to the specific media type. Based thereon, the management computer 4 acquires and stores the table content from each printer 3 in the storage 42. The management computer 4 then references the content of the tables stored in the storage 42, and sets the machine parameters in the printer 3.

The printing system 1 according to this embodiment includes multiple printers 3, and can use the different printers 3 in the printing processes. The printing system 1 according to the invention is therefore configured as described below so that which printers 3 can be used in printing processes, and the status of those printers 3, can be easily known by the operator (user) of the management computer 4.

Figure 3:
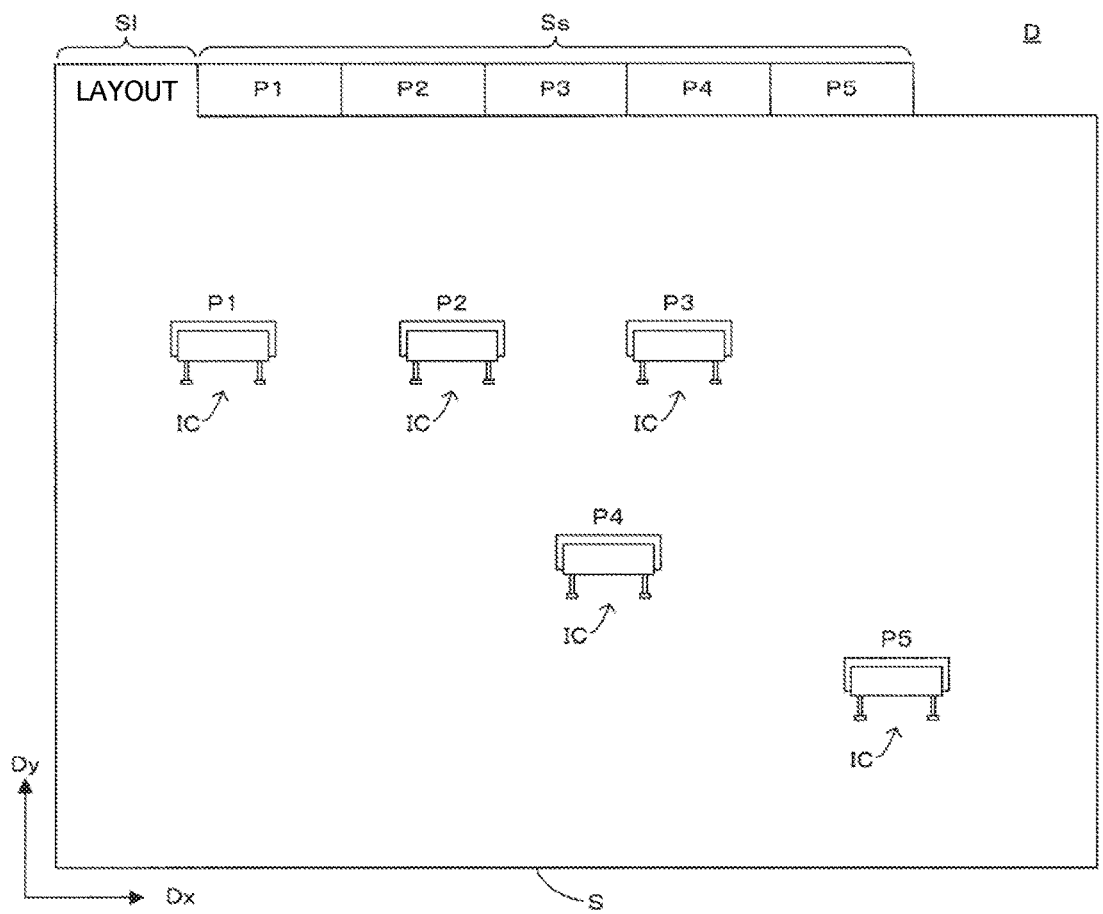
FIG. 3 shows a first example of display content presented on the display.
Figure 4:
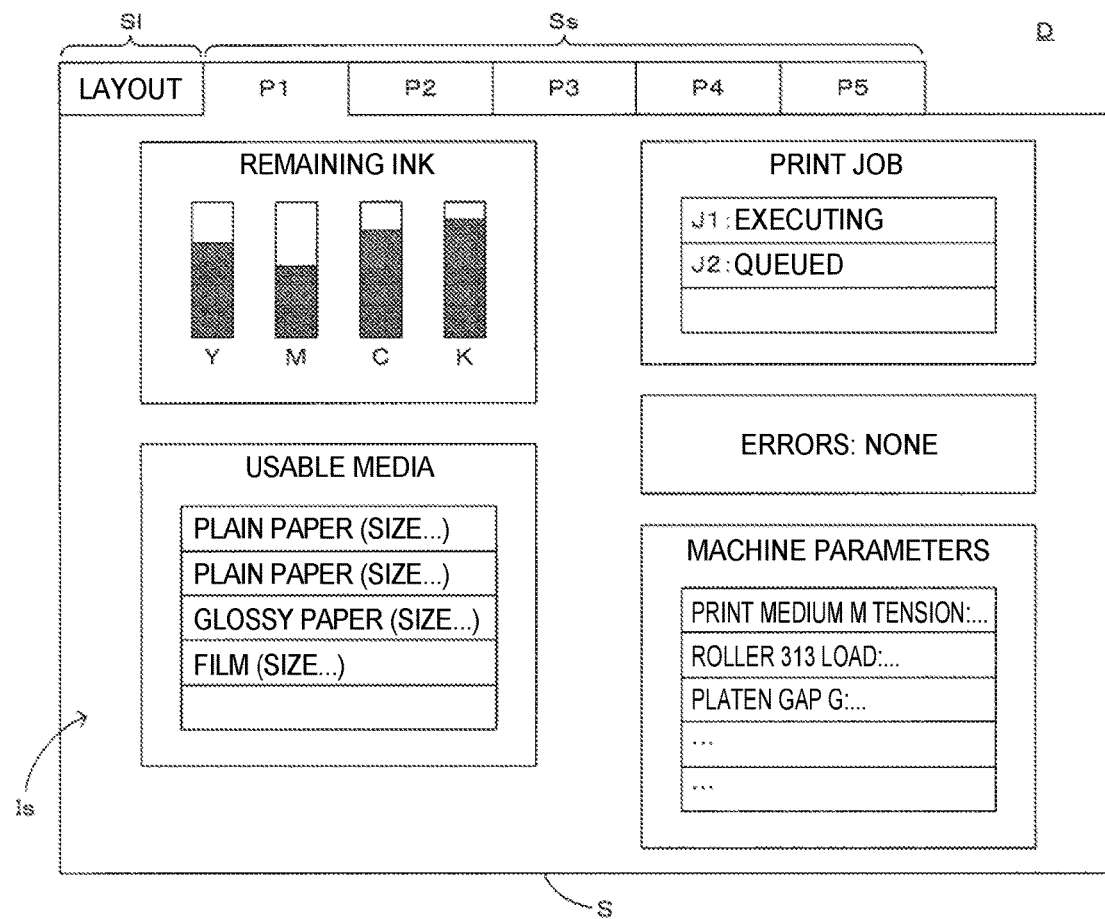
FIG. 4 shows a first example of display content presented on the display.

FIG. 3 and FIG. 4 show a first example of the display content presented on a display through the user interface of the management computer. These and other figures show a Cartesian coordinate system used by the management computer 4 with a horizontal axis Dx (first direction) and a vertical axis Dy (second direction perpendicular to the first direction). The user interface 43 of the management computer 4 includes an input device such as a mouse and keyboard, and a display D as shown in the figures. The display D has a tabbed interface for switching between any of six windows, including a layout window SI and five status windows Ss. To select a particular status window Ss, the user simply selects through the user interface 43 the appropriate tab shown across the top of the status window Ss.

The management computer 4 of the printer 14 also embodies an icon display means 411. The icon display means 411 displays in the layout screen SI multiple icons IC, one for each printer P1 to P5 managed by the management computer 4. In response to user operation of the user interface 43, the icon display means 411 changes the display position of the icons IC in the layout screen SI on the horizontal axis Dx and vertical axis Dy, that is, two dimensionally. The user can therefore adjust the display position of each icon IC according to the actual layout (location) of the individual printers 3. As a result, the printers 3 managed by the management computer 4 can be seen in the layout screen SI appropriately to the actual layout (arrangement) of the printers 3.

The management computer 4 of the printer 14 also embodies a status display means 412. Status information Is for each printer P1 to P5 managed by the management computer 4 is presented by the status display means 412 in a status window Ss. The five status windows Ss corresponding to the five printers P1 to P5 the management computer 4 manages can be presented in the display D. As shown in FIG. 4, when the status window Ss corresponding to printer P1, for example, is selected, the display D presents the status information Is for printer P1 in the status window Ss.

In this example, the status information Is includes the remaining ink level for each color of ink (Y, M, C, K) used in the printer P1; the type of print media M that can be used in the printer P1; the current status of print jobs J queued for the printer P1; whether or not an error has occurred on the printer P1; and the machine parameters that are currently set on the printer P1. However, the information that can be displayed as the status information Is is not limited to the foregoing, and any information related to a particular status of the printer P1 can be displayed as status information Is. Displaying all information shown as examples of status information Is here is also not necessary.

The example in FIG. 4 indicates that an error has not occurred, but if an error, such as no paper, a paper jam, or no ink, occurs, the operation required to resolve the error may be displayed in the status window Ss. More specifically, if an error has occurred and the user selects the error field in the user interface 43, the status display means 412 in this example senses the selection and displays on the status window Ss an animation of what to do. The user can then follow the animated steps to appropriately execute the operation required to resolve the error.

In the embodiment described above, multiple icons IC corresponding to multiple different printers P1 to P5 are displayed in a two-dimensional graphic display in the display D. As a result, the user can easily know information about the multiple printer P1 to P5 that are managed. Status information Is related to the current status of the printer P1 to P5 represented by each icon IC can also be displayed. Therefore, the user can know the status of and easily manage each of multiple printers P1 to P5.

The display D can also switch the displayed status window Ss to any of the multiple status windows Ss.

The status windows Ss include a layout screen SI for displaying the icons IC, and a status window Ss displaying, for each printer P1 to P5, status information Is for the corresponding printer. The icon display means 411 displays multiple icons IC on the layout screen SI, and the status display means 412 displays status information Is for each printer P1 to P5 in a status window Ss corresponding to a particular printer P1 to P5. By changing the status window Ss presented on the display D, this configuration enables the user to acquire the current status information Is for a desired printer P1 to P5.

The display D is disposed to the management computer 4 that manages the printers P1 to P5. The user operating the management computer 4 can therefore manage the printers P1 to P5 based on the current status of the multiple printers P1 to P5.

A variation of the foregoing embodiment is described below. The following description focuses on the differences with the foregoing, identifies like parts with the same reference numerals, and abbreviates or omits further description thereof. It will also be obvious that the effects described above are also achieved by using like configurations.

Figure 5:
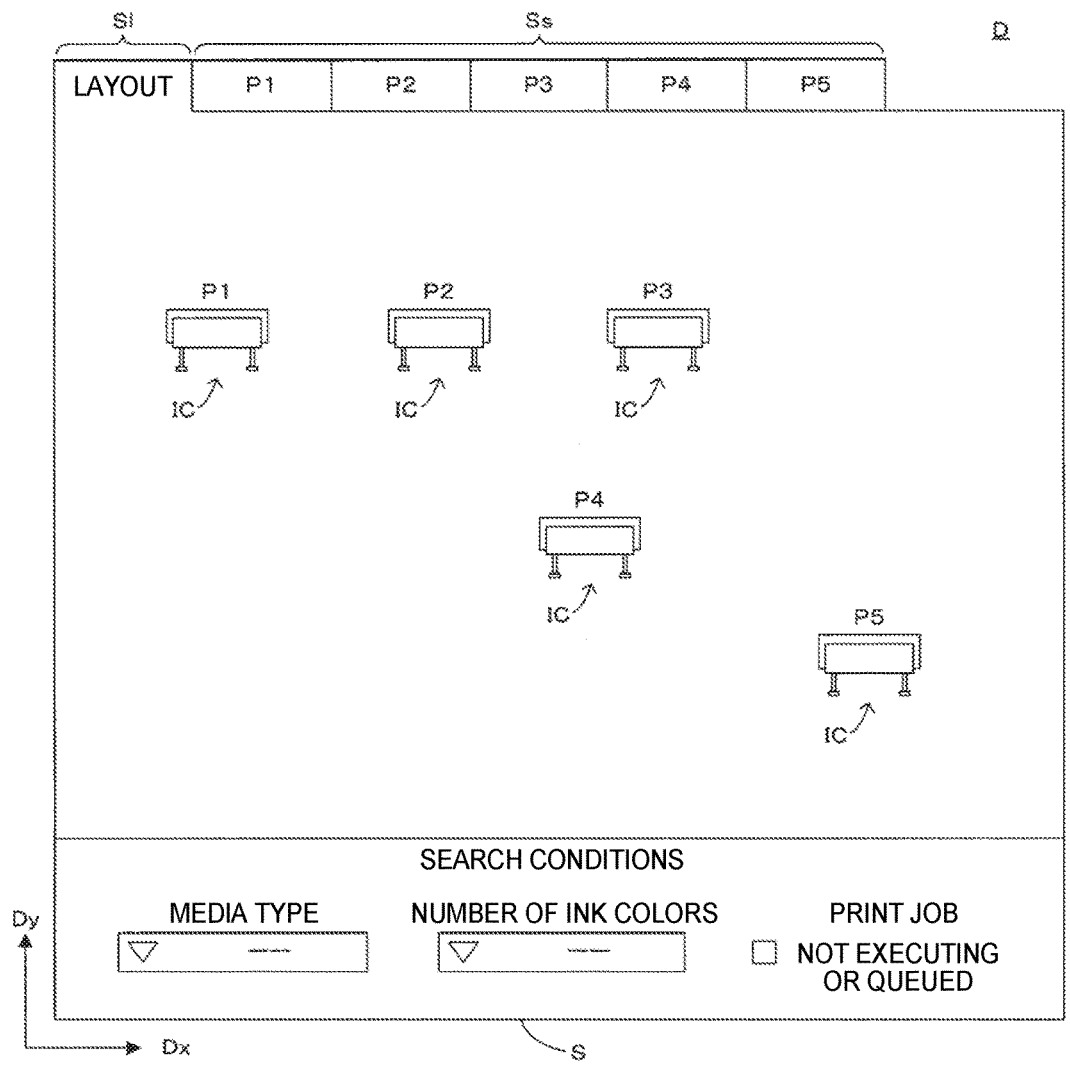
FIG. 5 shows a second example of display content presented on the display.

FIG. 5 shows a second example of the display content presented in the user interface of the management computer 4. The example in FIG. 5 has an area at the bottom of the layout screen SI for defining search conditions. More specifically, the media type of print media M that can be used, the number of colors of ink, and the current status of print job J execution are displayed in this example. The media type and number of ink colors can be specified by selecting from corresponding pull-down menus, and the state of print job J execution can be specified by selecting the checkbox for executing/queued print jobs.

Through the user interface 43, the user can search the printers P1 to P5 to determine if there is a printer that can print to glossy paper, print with six colors of ink, and does not have any print jobs J executing or queued by specifying the appropriate search conditions.

The specific conditions that can be set as search conditions are not limited to the foregoing, and may include, for example, whether or not an error has occurred or the remaining ink level. Including all of the foregoing conditions as search conditions is also not required.

More specifically, the icon display means 411 searches the printers P1 to P5 for a printer that matches the search conditions set in the layout screen SI. The icon display means 411 also changes the appearance of the icon IC for any printer satisfying the search conditions from the appearance of the icons IC for any printer not satisfying the search conditions. More specifically, the icons IC of printers satisfying the search conditions may be conspicuously differentiated from the icons IC of printers not satisfying the search conditions by, for example, making the icon IC of any printer satisfying the search conditions enlarged or blink, or making the icon IC of any printer not satisfying the search conditions semitransparent.

In the example in FIG. 5, the display D changes the displayed appearance of the icon IC of a printer for which the status information Is matches the search conditions from the displayed appearance of the icon IC of a printer for which the status information Is does not match the search conditions. The user can therefore easily know which of the printers P1 to P5 have status information Is that matches the search conditions.

The user can input the search conditions through the user interface 43. Therefore, by inputting to the user interface 43, the user can easily know which of the printers P1 to P5 matches the desired search conditions.

Figure 6:
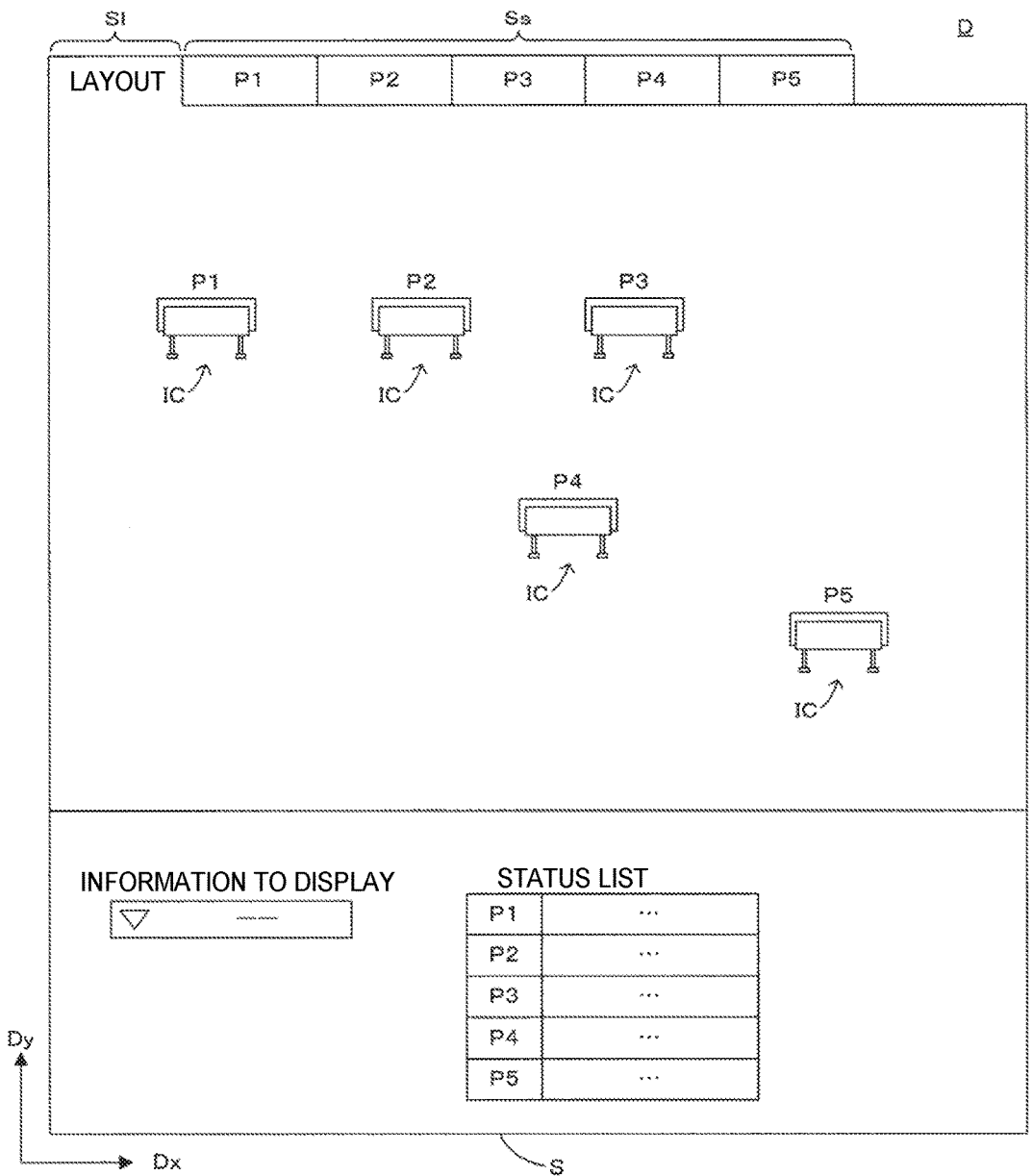
FIG. 6 shows a third example of display content presented on the display.

FIG. 6 shows a third example of the display content presented in the user interface of the management computer 4. The example in FIG. 6 has an area at the bottom of the layout screen SI for displaying a status list. More specifically, the user can, through the user interface 43, select one type of information included in the status information from a pulldown menu of information that can be displayed. The status display means 412 then displays the selected information (parameter) for each of the printers P1 to P5. For example, if the media type of the print medium M currently loaded in the printer is selected as the information to display, the type of print medium currently loaded in each printer P1 to P5 is displayed in the status list.

The status display means 412 can thus display specific information selected from the multiple types of information included in the status information Is for each printer P1 to P5 on the display D. The user can therefore display desired information for multiple printers P1 to P5 in a single batch.

As described above, a display 10 including the icon display means 411, status display means 412, and user interface 43 is an example of a display device of the invention; the display D is an example of a display of the invention; the icon display means 411 is an example of a first display means of the invention; the status display means 412 is an example of a second display means of the invention; an icon IC is an example of an image of the invention; the status information Is is an example of printer information of the invention; the printers P1 to P5 are examples of a printer of the invention; the status window Ss is an example of a window of the invention; the layout screen SI is an example of an image window of the invention; the status window Ss is an example of an information window of the invention; a search condition is an example of a specific condition of the invention; the user interface 43 is an example of an input device of the invention; and the management computer 4 is an example of a management device of the invention.

The invention being thus described, it will be obvious that it may be varied in many ways without departing from the scope of the accompanying claims. For example, the appearance of the icons IC displayed in the layout screen SI may be changed as described below.

Figure 7:
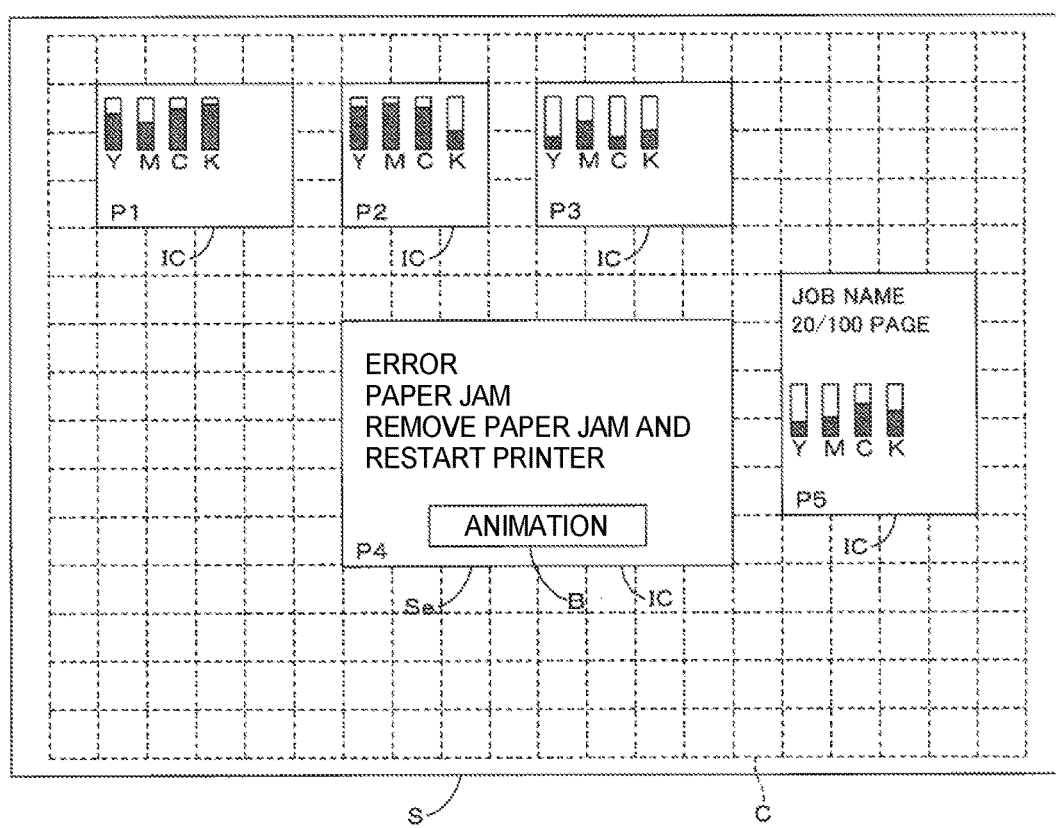
FIG. 7 shows a fourth example of display content presented on the display.

FIG. 7 shows a fourth example of display content presented in the user interface of the management computer 4. In the example in FIG. 7, the display D presents a window Ss having multiple rectangular cells C arrayed in a grid. The icon display means 411 displays the icons IC as groups of multiple cells C on the layout screen SI. The status display means 412 then presents the status information is inside each icon IC.

In this example, multiple icons IC corresponding to different printers P1 to P5 are displayed in a two-dimensional arrangement on the display D. Information about multiple managed printers P1 to P5 can therefore be easily confirmed visually. In addition, status information Is of the printer P1 to P5 corresponding to each icon IC can be displayed on the display D. The printers can therefore be managed knowing the status of each of the printers P1 to P5.

By automatically enlarging the icon IC (display area) of the corresponding printer when a printer error occurs, the status display means 412 can display detailed information about the printer in the icon IC.

In this example, the error content (that the print medium M jammed) is reported, together with text informing the user of what must be done to resolve the error, in an error report window Se generated by enlarging the icon IC for the printer P4 where the error occurred. The error report window Se in this example also has a button B for running a corresponding animation. When the user operates this button B, the status display means 412 displays an animation of the operation required to resolve the error in the display D. The button B may also be omitted and an animation displayed automatically when an error occurs.

The icon IC of a printer with a higher frequency of use than other printers P1 to P5 (printer P5 in this example) may also be automatically enlarged even when an error has not occurred to display more information, such as the names of queued print jobs J and their progress, or to change the displayed information according to the printer status, for greater user convenience.

The status display means 412 can thus display, through text or animation, the operation that must be performed to resolve an error that has occurred in a particular printer 4. The user can then easily resolve the error that occurred in the printer P4 by simply following the text or animation-based instructions.

Furthermore, printer management is further facilitated by displaying more information for frequently used printers even when an error has not occurred.

The configurations illustrated in FIG. 5 and FIG. 6 may also be applied to the example in FIG. 7. In other words, a printer meeting specific search conditions can be made conspicuous, and information about plural printers P1 to P5 can be displayed in a single batch.

The specific display format of the status information Is is not limited to the examples in FIG. 4 and FIG. 7. Printer status information Is may be displayed in response to user selections made in the layout screen SI (FIG. 3). In this example, the icon display means 411 displays only the layout screen SI shown in FIG. 3 on the display D. Through the user interface 43, the user can select an icon IC displayed in the layout screen SI. The status display means 412 displays, in a popup menu, status information Is for the printer corresponding to the icon IC selected by the user. In this configuration, the user, by selecting an icon IC from the display D, can get the status information Is for a desired printer selected from the multiple printers P1 to P5.

Figure 8:
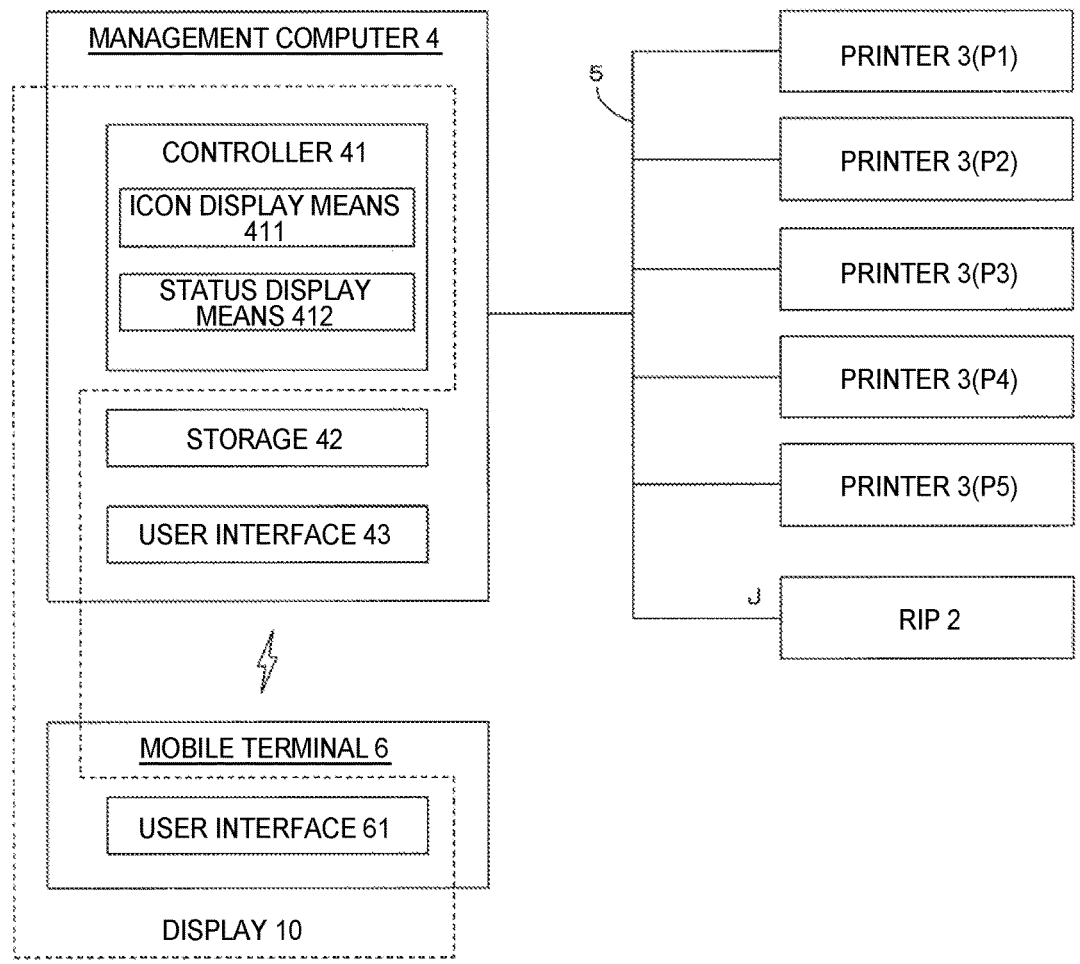
FIG. 8 is a block diagram showing another example of a printing system.

FIG. 8 is a block diagram of a variation of a printing system according to the invention. This printing system 1 additionally includes a mobile terminal 6 such as a smartphone or tablet computer. The mobile terminal 6 can communicate with the management computer 4 through a wireless LAN or the Internet, for example.

The icon display means 411 displays icons IC in the display D of the user interface 61 of the mobile terminal 6, and the status display means 412 displays status information Is in the display D of the mobile terminal 6. As a result, the user of the mobile terminal 6 can know the status of and manage multiple printers P1 to P5. In the example in FIG. 8, the display 10 including the icon display means 411, status display means 412, and user interface 61 functions as a display device of the invention.

The specific configuration of the display 10 is not limited to the configurations shown in FIG. 1 and FIG. 8. Therefore, the icon display means 411 and status display means 412 may be part of the mobile terminal 6, and the display 10 may be part of the printer 3.

The number of management computers 4 in the printing system 1 is also not limited to one, and the printing system 1 may include multiple management computers 4. In this case, each management computer 4 does not need to manage all of the printers 3 in the printing system 1, and may be configured to manage only some of the printers 3. The display D of each management computer 4 may also change the display format to differentiate the display icons IC for those printers P1 to P5 managed by that management computer 4 from the display icons IC for those printers P1 to P5 not managed by that management computer 4. More specifically, the icons IC of the managed printers may be differentiated from the icons IC of printers that are not managed by the management computer 4 by making the icons IC of the managed printers blink or enlarging the icons IC, or displaying semitransparent icons IC for printers that are not managed.

The number of printers P1 to P5 is also not limited to the foregoing, and there may be any desired number.

The configuration of the user interface 43 can also obviously be changed as desired. For example, the display D may be configured as a touch panel, and the input device and the output device (display D) of the user interface 43 may be integrated as a single device.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A management device comprising:
a display;
a controller connected over a network to multiple different printers, the controller configured to communicate with each of the multiple different printers over the network, the controller comprising:
a first display means configured to present multiple images corresponding to the multiple different printers in a user interface presented on the display in a two-dimensional arrangement, wherein the first display means is configured such that the multiple images are arranged to correspond to actual locations of the multiple different printers; and
a second display means configured to present in the user interface presented on the display the display printer information relating to a status of the printer corresponding to each image,
wherein the multiple images and the printer information are presented through a tabbed interface, the two-dimensional arrangement is on a content window of a layout tab of a plurality of tabs of the tabbed interface and the printer information for each of the printers of the multiple different printers is on content windows of the other tabs of the plurality of tabs of the tabbed interface, the layout tab also comprising a search condition area at a bottom of the layout tab within which at least one searchable condition is presented,
wherein, a first printer of the multiple different printers is displayed on a second tab of the plurality of tabs, the printer information comprising a remaining ink level, usable media list, print job status, error message, and printer parameters,
wherein, the controller changes a display format presented in the two-dimensional arrangement to identify which of the multiple different printers satisfy the at least one searchable condition selected in the search condition area.

2. The management device described in claim 1, wherein:
the display is configured to change between and display any one of multiple windows;
the multiple windows include an image window for displaying images, and an information window for displaying printer information;
the information window is provided for each printer;
the first display means presents multiple images in the image window; and
the second display means presents printer information for a specific printer in a window corresponding to the specific printer.

3. The management device described in claim 1, wherein:
the second display means displays the printer information as an animation of an operation required for the printer corresponding to the image.

4. The management device described in claim 3, wherein:
the animation the second display means displays is a procedure required to resolve an error that occurred in the printer.

5. The management device described in claim 4, wherein:
the second display means displays a content of an error that occurred on the printer and a button for playing the animation, and when the button is operated, displays the procedure required to resolve the error that occurred in the printer.

6. The management device described in claim 1, wherein:
the first display means displays printer information for a printer with a higher frequency of use larger than for a printer with a lower frequency of use.

7. The management device described in claim 1, wherein:
the second display means displays as the printer information the name of a print job of the printer or the progress of the print job.

8. The management device described in claim 1, wherein:
the second display means displays, as the printer information, a required action corresponding to the status of the printer.

9. The management device described in claim 1, wherein:
the printer information comprising a media type of print medium that can be used, a number of colors of ink, and a current status of print job execution, and an image indicating the printer information of the corresponding printer does not satisfy the specific condition.

10. The management device described in claim 9, further comprising:
an input device enabling inputting the specific condition.

11. The management device described in claim 1, wherein:

the printer information includes multiple types of information about the corresponding printer; and the second display means displays information selected from the multiple types of information for the printer on the display.

12. The management device described in claim 1, wherein:

the display is disposed to a management device configured to manage the printers.

13. The management device described in claim 12, wherein:

the display changes the display format between images corresponding to the printers the management device manages, and images corresponding to the printers the management device does not manage.

14. The management device described in claim 1, wherein:

the display is disposed to a mobile terminal.

15. A display method comprising:

communicating, by a management computer, with multiple different printers over a network, wherein the multiple different printers are connected to the network;

displaying multiple images corresponding to multiple different printers in a display of the management computer, in a two-dimensional arrangement, wherein the multiple different printers are arranged such that the positions of the multiple images correspond to actual locations of the multiple different printers, wherein the two-dimensional arrangement is on a layout tab of a plurality of tabs of a tabbed interface, the layout tab also comprising a search condition area at a bottom of the layout tab within which at least one searchable condition is presented;

displaying in the display printer information relating to a status of the printer corresponding to each image, wherein the printer information for each of the printers of the multiple different printers is on other tabs of the plurality of tabs of the tabbed interface, wherein, a first printer of the multiple different printers is displayed on a second tab of the plurality of tabs, the printer information comprising a remaining ink level, usable media list, print job status, error message, and printer parameters; and changing a display format presented in the two-dimensional arrangement to identify which of the multiple different printers satisfy the at least one searchable condition selected in the search condition area.

* * * * *